(12) United States Patent
Voigt

(10) Patent No.: US 11,518,415 B2
(45) Date of Patent: Dec. 6, 2022

(54) DRIVER-INITIATED DISENGAGEMENT OF AUTONOMOUS VEHICLE CONTROLS

(71) Applicant: TOYOTA RESEARCH INSTITUTE, INC., Los Altos, CA (US)

(72) Inventor: Jonathan Roy Voigt, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 126 days.

(21) Appl. No.: 16/856,014

(22) Filed: Apr. 22, 2020

(65) Prior Publication Data

US 2021/0331711 A1 Oct. 28, 2021

(51) Int. Cl.
*B60W 60/00* (2020.01)
*B60W 50/04* (2006.01)

(52) U.S. Cl.
CPC ........ *B60W 60/0054* (2020.02); *B60W 50/04* (2013.01)

(58) Field of Classification Search
CPC ............. B60W 60/0054; B60W 50/04; B60W 2050/007
See application file for complete search history.

(56) References Cited

U.S. PATENT DOCUMENTS

| | | | |
|---|---|---|---|
| 2014/0156134 A1* | 6/2014 | Cullinane | B60W 50/082 701/23 |
| 2014/0303827 A1* | 10/2014 | Dolgov | B60W 30/00 701/23 |
| 2014/0379205 A1* | 12/2014 | Muetzel | B60W 50/04 701/32.4 |
| 2018/0074501 A1 | 3/2018 | Boniske | |
| 2019/0018409 A1 | 1/2019 | Nickolaou | |
| 2019/0092341 A1* | 3/2019 | Stark | B60W 60/0054 |
| 2019/0389482 A1 | 12/2019 | Michalakis | |
| 2020/0050194 A1* | 2/2020 | Choi | G05D 1/0061 |
| 2021/0116907 A1* | 4/2021 | Altman | G01C 21/3461 |

* cited by examiner

*Primary Examiner* — Tyler J Lee
*Assistant Examiner* — Yufeng Zhang
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for a selective disengagement mechanism that allows a vehicle passenger, e.g., driver, to pre-emptively prepare to override autonomous control of a vehicle. A selective disengagement switch may be actuated by the driver. An autonomous control system of the vehicle, unaware of the selective disengagement switch operation, may at some point erroneously command the vehicle to move. Because the driver has actuated the selective disengagement switch, upon receipt of the erroneous command to move the vehicle, the autonomous control system may be overridden. The driver need not react to a safety-critical event or scenario.

19 Claims, 7 Drawing Sheets

DRIVER-INITIATED DISENGAGEMENT OF AUTONOMOUS VEHICLE CONTROLS

TECHNICAL FIELD

The present disclosure relates generally to autonomous driving, and in particular, some implementations may relate to overriding autonomous driving control systems.

DESCRIPTION OF RELATED ART

Advanced driver-assistance systems (ADAS) can refer to electronic systems that assist a vehicle operator while driving, parking, or otherwise maneuvering a vehicle. ADAS can increase vehicle and road safety by minimizing human error, and introducing some level of automated vehicle/vehicle feature control. Autonomous driving systems may go further than ADAS by leaving responsibility of maneuvering and controlling a vehicle to the autonomous driving systems. For example, an autonomous driving system may comprise some package or combination of sensors to perceive a vehicle's surroundings, and advanced control systems that interpret the sensory information to identify appropriate navigation paths, obstacles, road signage, etc.

BRIEF SUMMARY OF THE DISCLOSURE

In accordance with one embodiment, a vehicle may comprise an autonomous control system adapted to provide one or more commands to autonomously control one or more systems of the vehicle. The vehicle may further comprise a selective disengagement mechanism adapted to be activated by a driver of the vehicle allowing the autonomous control system to be overridden only when the selective disengagement mechanism is active and the autonomous control system attempts to initiate movement of the vehicle.

The selective disengagement mechanism comprises an actuatable mechanism actuated by a passenger of the vehicle.

The vehicle further comprises a safety control unit operatively connected to the autonomous control system and to the selective disengagement mechanism, the safety control unit determining whether or not to allow autonomous control of the vehicle to be executed by the autonomous control system.

The safety control unit comprises one or more determination units making determinations regarding whether or not to allow the autonomous control of the vehicle to be executed based on one or more factors.

At least two of the one or more factors comprises whether the selective disengagement mechanism is active and whether the autonomous control system attempts to initiate movement of the vehicle.

The safety control unit effectuates overriding of the autonomous control system by blocking commands of the autonomous control system from reaching one or more actuators controlling movement of the vehicle.

Despite the overriding of the autonomous control system, the autonomous control system continues to send the commands to the one or more actuators, and wherein the autonomous control system is ignorant of the blocking of the commands from reaching the one or more actuators.

The vehicle further comprises a memory unit monitoring at least the transmission of commands from the autonomous control system, and recording information regarding the commands even when the commands are being blocked.

The memory unit further records time-series data regarding operating conditions and characteristics of one or more vehicle systems under the control of or providing guidance to the autonomous control system.

The memory unit further records time-series data representative of activation and deactivation of the selective disengagement mechanism.

A vehicle, comprises: a processor; and a memory unit operatively connected to the processor and including computer code, that when executed, causes the processor to: monitor operation of a selective disengagement mechanism; upon determining that the selective disengagement mechanisms is operational, monitor autonomous control command signals from an autonomous control system of the vehicle; upon identifying autonomous control command signals commanding movement of the vehicle from the monitored autonomous control command signals, prevent the autonomous control command signal commanding the movement of the vehicle from effectuating movement of the vehicle.

The operation of the selective disengagement mechanism comprises actuation of the selective disengagement mechanism by a vehicle passenger in response to a passenger-recognized safety-critical scenario.

The memory unit includes computer code, that when executed, further causes the processor to allow the autonomous control command signal to pass to one or more vehicle actuators enabling movement of the vehicle upon determining that the selective disengagement mechanism is not operational.

The memory unit includes computer code, that when executed, further causes the processor to log the monitored autonomous control command signals along with information regarding the determination that the selective disengagement mechanism is operational.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
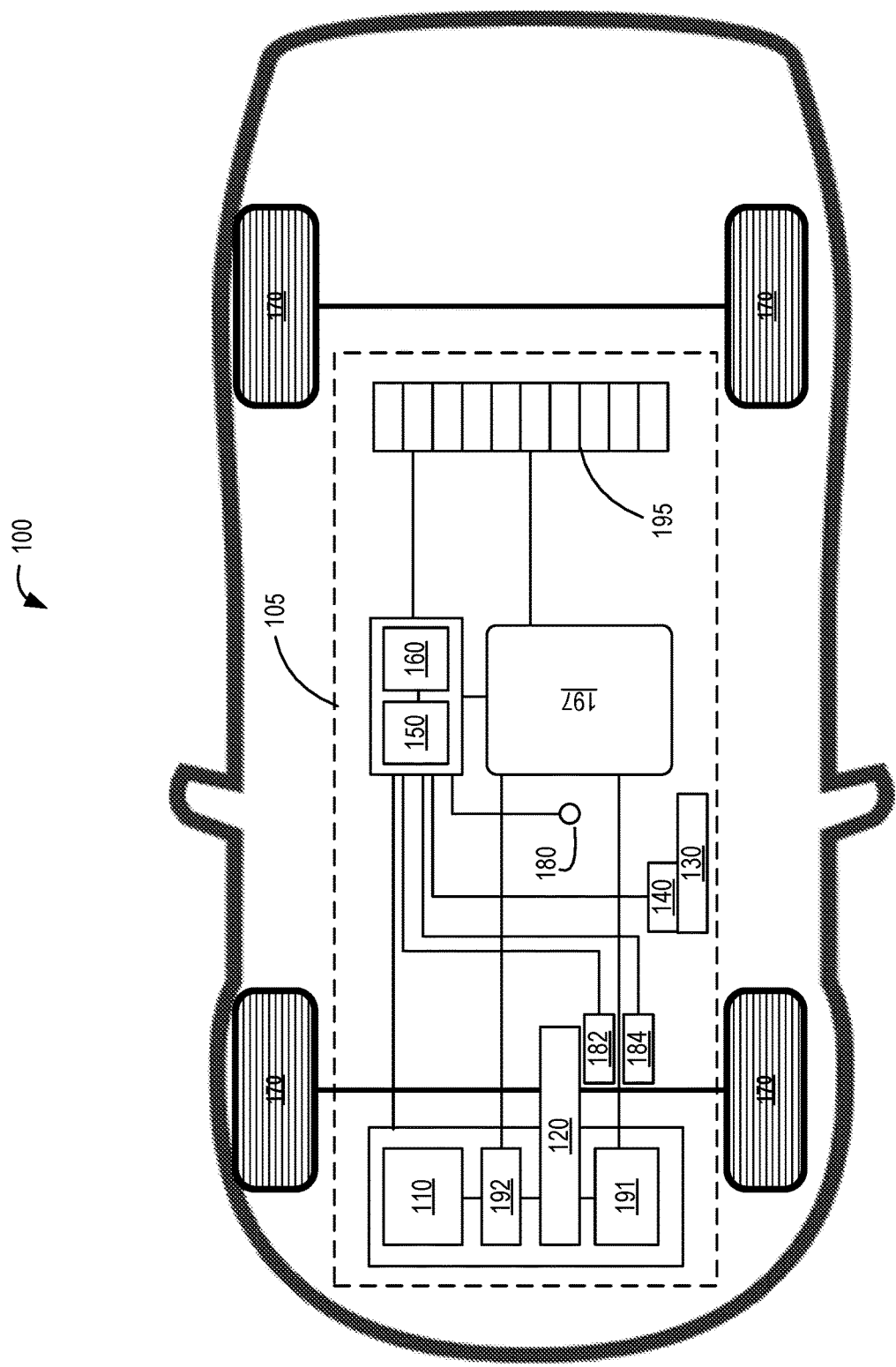
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

As alluded to above, ADAS and autonomous driving control systems can be used in vehicles that at least, in part, controls or manages vehicle operation to provide varying levels of automated control or assistance. For ease of reference, the term "autonomous control" will be used herein to refer to such systems. In some vehicles, an override mechanism, such as an override switch, may be used to turn off or disengage a vehicle's autonomous control system. Such an override mechanism can allow a driver/operator or passenger to assume manual control of a vehicle. However, conventional implementations of override mechanisms completely disable the autonomous control system. Moreover, when invoking conventional implementations of override mechanisms in a safety scenario (e.g., to avoid a collision), a vehicle operator still engages in a human/manual situational assessment, and intervention/overriding autonomous control still involves human reaction time.

Accordingly, various embodiments are directed to a more selective driver-initiated disengagement mechanism (or selective disengagement for short) for autonomous control systems. Selective disengagement can be applied to/used to intervene on a vehicle's autonomous control system(s). Vehicles may have a safety control unit between the vehicle's controls (electronic control unit (ECU), drive train control, actuators, etc.) and the vehicle's autonomous control system. The safety control unit acts to determine when a vehicle's autonomous control system is allowed to actually control vehicle operation. Generally, vehicle operation in this context involving movement of the vehicle (driving forward, backward, turning, etc.). For example, the safety control unit may receive commands from the vehicle's autonomous control system, and when warranted, converts such commands or forwards such commands to actual vehicle control systems, e.g., the ECU that control motor operation, or the throttle that controls engine operation, to effectuate movement.

Selective disengagement may be implemented as a part of or may operate through the safety control unit. Selective disengagement can be invoked by a vehicle operator or passenger using a selective disengagement button, switch or other invocation mechanism, such as a touchscreen-based control, voice, etc. Selective disengagement triggers a soft request that commands the safety control unit to disengage autonomous control when it receives commands from a vehicle's autonomous control system to initiate movement of the vehicle. However, a vehicle's autonomous control system will not be disengaged just because or only upon invoking selective disengagement/depressing a selective disengagement button. Selective disengagement will only actually disengage the autonomous control system upon the safety control unit also receiving an autonomous control system command to move the vehicle.

For example, consider a scenario in which a vehicle with autonomous control and implemented with selective disengagement is stopped at a red light. A driver, wary of having time to react to a potential collision, may, upon noticing a pedestrian coming to the interaction at which the vehicle is stopped, depress the selective disengagement button. If the vehicle's autonomous control senses the pedestrian and correctly prohibits or otherwise avoids commanding the vehicle to move into the path of the pedestrian, the vehicle's autonomous control system is allowed to operate/remain engaged without intervention. That is, selective disengagement is operational, but does not affect the vehicle's autonomous control system. Moreover, selective disengagement is hidden from the vehicle's autonomous control system's decision-making process. That is, the vehicle autonomous control system is operationally unaware of the selective disengagement feature, when it is or is not invoked, etc.

If on the other hand, for some reason, the vehicle's autonomous control system were to send a command to the safety control unit to move the vehicle in some way, e.g., forward into the intersection, because the selective disengagement button has been activated, the vehicle's autonomous control system will be overridden/disengaged. That is, the vehicle operator may, e.g., hold down the selective disengagement button, and if the vehicle's autonomous control system sends a command to the safety control unit to move, the safety control unit can override or ignore the command. Because the safety control unit is already aware of the potential need to override a command from the autonomous control system due to the selective disengagement button being depressed, and because there is no human delay involved, the safety control unit can act instantaneously. The vehicle operator need not see a situation, assess the situation, make a decision regarding how to react to the situation, actually react to the situation, e.g., by slamming the brakes, etc. If the risk/situation ceases to be an issue, the vehicle operator may just release the selective disengagement button. Again, the vehicle's autonomous control system continues to operate having no knowledge that selective disengagement was ever invoked.

Thus, the vehicle operator has added piece of mind knowing he/she will not have to react to situations in real-time. For example, the vehicle operator may, e.g., choose to depress the selective disengagement button whenever he/she determines a potentially hazardous (or other) situation could arise as a result of unwanted vehicle movement. For example, the vehicle operator may elect to depress the selective disengagement button whenever he/she is stopped at an intersection, stopped due to some roadway obstruction, stopped for any reason, etc.

As an added advantage, any sort of data collection, monitoring of the vehicle's autonomous control system/ operation, etc. goes uninterrupted. For example, in actual operation or during testing/simulation scenarios, conventional disengagement mechanisms that override a vehicles autonomous control system(s) shuts the autonomous control system down such that no data can be captured regarding an event prompting the override. In a case where the driver/ passenger recognizes a safety-critical scenario, and actuates the selective disengagement button or switch, and the vehicle's autonomous control system reacts/behaves "correctly" in response to the safety-critical scenario (e.g., not moving if the vehicle should not move), a record of the selective disengagement button or switch actuation can be easily identified. Further still, if a driver/passenger decides to let go of the selective disengagement button or switch, data need not be collected, making for less cluttered/noisy autonomous control system data collection.

The systems and methods disclosed herein may be implemented with or by any of a number of different vehicles and vehicle types. For example, the systems and methods disclosed herein may be used with automobiles, trucks, motorcycles, recreational vehicles and other like on-or off-road vehicles. In addition, the principles disclosed herein may also extend to other vehicle types as well. An example hybrid electric vehicle is illustrated and described below as one example.

FIG. 1 illustrates an example hybrid electric vehicle (HEV) 100 in which various embodiments for driver disengagement of autonomous vehicle/driving controls may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1B). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode. The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed ($N_E$) of engine 110 independently of the vehicle speed (V).

ECU 150 may include circuitry to control the above aspects of vehicle operation. ECU 150 may include, for example, a microcomputer that includes a one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG191. It should be understood that in embodiments where MG191 and MG192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG191 during regenerative coasting and braking.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally), battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2A:
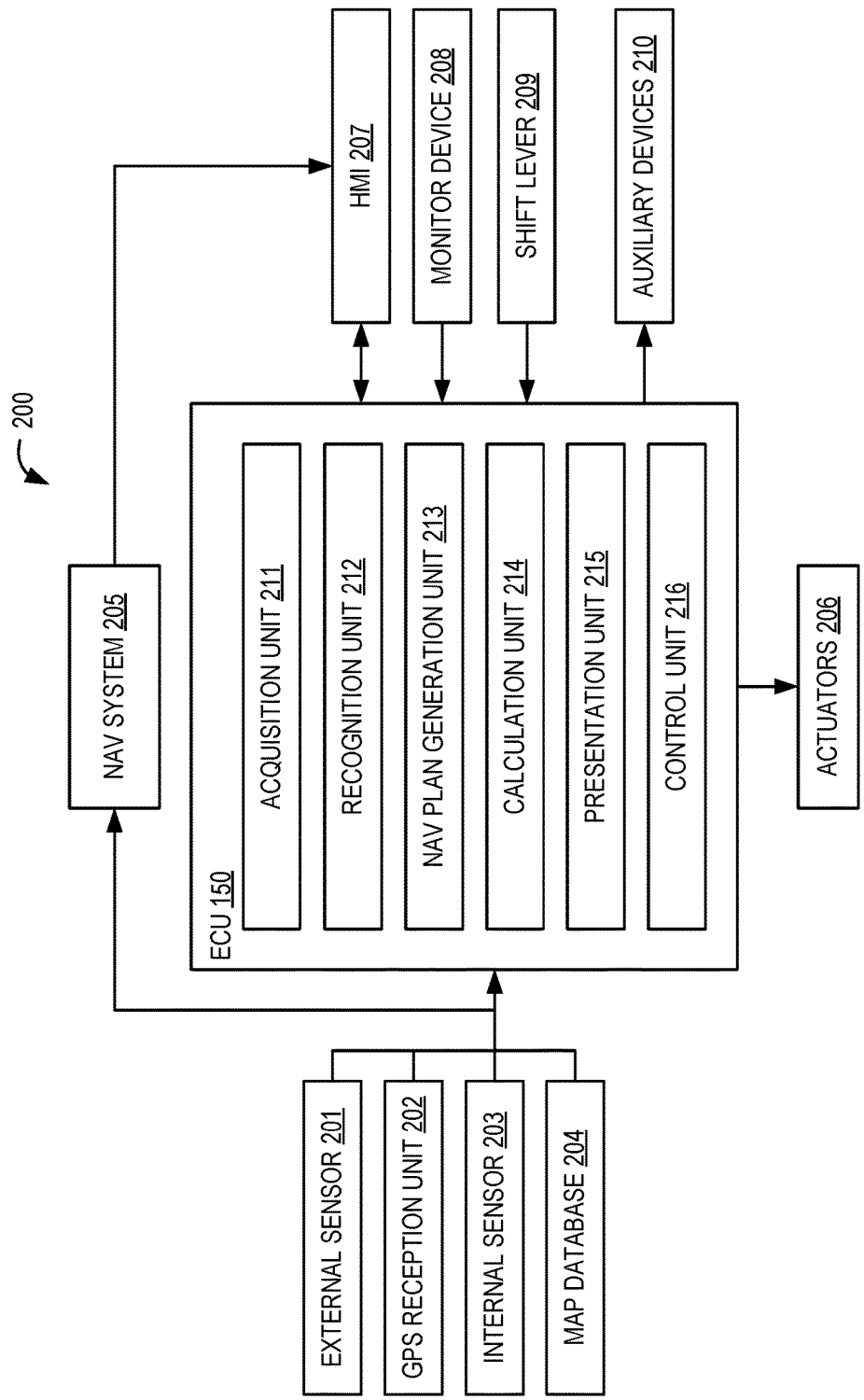
FIG. 2A illustrates an example autonomous control system.

FIG. 2A illustrates an example autonomous control system 200 that may be used to autonomously control a vehicle, e.g., HEV 100. Autonomous control system 200 may be installed in HEV 100, and executes autonomous control of HEV 100. As described herein, autonomous control can refer to control that executes driving/assistive driving operations such as acceleration, deceleration, and/or steering of a vehicle, generally movement of the vehicle, without depending or relying on driving operations/directions by a driver or operator of the vehicle.

As an example, autonomous control may include a lane keeping assist control where a steering wheel (not shown) is steered automatically (namely, without depending on a steering operation by the driver) such that HEV 100 does not depart from a running lane. That is, the steering wheel is automatically operated/controlled such that HEV 100 runs along the running lane, even when the driver does not perform any steering operation.

As another example, autonomous control may include navigation control, where when there is no preceding vehicle in front of the HEV 100, constant speed (cruise)

control is effectuated to make HEV 100 run at a predetermined constant speed. When there is a preceding vehicle in front of HEV 100, follow-up control is effectuated to adjust HEV 100's speed according to a distance between HEV 100 and the preceding vehicle.

In some scenarios, switching from autonomous control to manual driving may be executed. Whether or not to execute this switch from autonomous control to manual driving may be determined based on a comparison between a comparison target and a threshold. In one embodiment, the comparison target is quantified so as to be compared with the threshold. When the comparison target is equal to or more than the threshold, the autonomous control system 200 executes the switch from an autonomous control mode to a manual driving mode. In other situations/scenarios, autonomous control system 200 may take over operation, effecting a switch from manual driving/control to autonomous control. As will be discussed in greater detail below, autonomous control system 200 may make certain determinations regarding whether to comply or proceed with autonomous control based on a command from autonomous control system 200. For example, considerations regarding recoverability and vehicle control under certain conditions may be considered as factors in determining whether or not autonomous control can be safely executed. Such considerations may also be reflected as thresholds for comparison.

For example, when an operation amount of any of a steering operation, an acceleration operation, and brake operation by the driver of HEV 100 during the autonomous driving control becomes equal to or more than a threshold, autonomous control system 200 may execute a switch from autonomous control to manual control.

It should be understood that manual control or manual driving can refer to a vehicle operating status wherein a vehicle's operation is based mainly on driver-controlled operations/maneuvers. In an ADAS context, driving operation support control can be performed during manual driving. For example, a driver may be actively performing any of a steering operation, an acceleration operation, and a brake operation of the vehicle, while autonomous control apparatus 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver.

In the example shown in FIG. 2A, autonomous control system 200 is provided with an external sensor 201, a GPS (Global Positioning System) reception unit 202, an internal sensor 203, a map database 204, a navigation system 205, actuators 206, an HMI (Human Machine Interface) 207, a monitor device 208, a shift lever 209, auxiliary devices 210. Autonomous control system 200 may communicate with ECU 150, or in some embodiments (may be implemented with its own ECU).

In the example shown in FIG. 2A, external sensor 201 is a detector that detects external circumstances such as surrounding information of HEV 100. The external sensor 201 may include at least one of a camera, a radar, and a Laser Imaging Detection and Ranging (LIDAR) unit.

The camera unit may be an imaging device that images the external circumstances surrounding the vehicle. For example, the camera is provided on a back side of a front windshield of the vehicle. The camera may be a monocular camera or a stereo camera. The camera outputs, to the ECU 150, image information on the external circumstances surrounding the vehicle. The camera is not limited to a visible light wavelength camera but can be an infrared camera.

The radar unit uses radio waves to detect obstacles outside of the vehicle by transmitting radio waves to the surroundings of the vehicle, and receiving reflected radio waves from an obstacle to detect the obstacle, distance to the obstacle or a relative positional direction of the obstacle. The radar unit outputs detected obstacle information to the ECU 150.

The LIDAR unit may operate similar to the manner in which the radar unit operates except that light is used in place of radio waves. The LIDAR unit outputs detected obstacle information to the ECU 150.

In the example shown in FIG. 2A, GPS reception unit 202 receives signals from three or more GPS satellites to obtain position information indicating a position of HEV 100. For example, the position information can include latitude information and longitude information. The GPS reception unit 202 outputs the measured position information of the vehicle to the ECU 150.

In the example shown in FIG. 2A, the internal sensor 203 is a detector for detecting information regarding, e.g., a running status of HEV 100, operational/operating conditions, e.g., amount of steering wheel actuation, rotation, angle, amount of acceleration, accelerator pedal depression, brake operation by the driver of HEV 100. The internal sensor 203 includes at least one of a vehicle speed sensor, an acceleration sensor, and a yaw rate sensor. Moreover, internal sensor 203 may include at least one of a steering sensor, an accelerator pedal sensor, and a brake pedal sensor.

A vehicle speed sensor is a detector that detects a speed of the HEV 100. In some embodiments, HEV 100's speed may be measured directly or through calculations/inference depending on the operating conditions/status of one or more other components of HEV 100. For example, a wheel speed sensor can be used as the vehicle speed sensor to detect a rotational speed of the wheel, which can be outputted to ECU 150.

The acceleration sensor can be a detector that detects an acceleration of the vehicle. For example, the acceleration sensor may include a longitudinal acceleration sensor for detecting a longitudinal acceleration of HEV 100, and a lateral acceleration sensor for detecting a lateral acceleration of HEV 100. The acceleration sensor outputs, to the ECU 150, acceleration information.

The yaw rate sensor can be a detector that detects a yaw rate (rotation angular velocity) around a vertical axis passing through the center of gravity of HEV 100. For example, a gyroscopic sensor is used as the yaw rate sensor. The yaw rate sensor outputs, to the ECU 150, yaw rate information including the yaw rate of HEV 100.

The steering sensor may be a detector that detects an amount of a steering operation/actuation with respect to a steering wheel 30 by the driver of HEV 100. The steering operation amount detected by the steering sensor may be a steering angle of the steering wheel or a steering torque applied to the steering wheel, for example. The steering sensor outputs, to the ECU 150, information including the steering angle of the steering wheel or the steering torque applied to the steering wheel of HEV 100.

The accelerator pedal sensor may be a detector that detects a stroke amount of an accelerator pedal, for example, a pedal position of the accelerator pedal with respect to a reference position. The reference position may be a fixed position or a variable position depending on a determined parameter. The accelerator pedal sensor is provided to a shaft portion of the accelerator pedal AP of the vehicle, for example. The accelerator pedal sensor outputs, to the ECU 150, operation information reflecting the stroke amount of the accelerator pedal.

The brake pedal sensor may be a detector that detects a stroke amount of a brake pedal, for example, a pedal position of the brake pedal with respect to a reference position. Like the accelerator position, a brake pedal reference position may be a fixed position or a variable position depending on a determined parameter. The brake pedal sensor may detect an operation force of the brake pedal (e.g. force on the brake pedal, oil pressure of a master cylinder, and so on). The brake pedal sensor outputs, to the ECU 150, operation information reflecting the stroke amount or the operation force of the brake pedal.

A map database 204 may be a database including map information. The map database 204 is implemented, for example, in a disk drive or other memory installed in HEV 100. The map information may include road position information, road shape information, intersection position information, and fork position information, for example. The road shape information may include information regarding a road type such as a curve and a straight line, and a curvature angle of the curve. When autonomous control system 200 uses a Simultaneous Localization and Mapping (SLAM) technology or position information of blocking structural objects such as buildings and walls, the map information may further include an output signal from external sensor 201. In some embodiments, map database 204 may be a remote data base or repository with which HEV 100 communicates.

Navigation system 205 may be a component or series of interoperating components that guides the driver of HEV 100 to a destination on a map designated by the driver of HEV 100. For example, navigation system 205 may calculate a route followed or to be followed by HEV 100, based on the position information of HEV 100 measured by GPS reception unit 202 and map information of map database 204. The route may indicate a running lane of a section(s) of roadway in which HEV 100 traverses, for example. Navigation system 205 calculates a target route from the current position of HEV 100 to the destination, and notifies the driver of the target route through a display, e.g., a display of a head unit, HMI 207 (described below), and/or via audio through a speaker(s) for example. The navigation system 205 outputs, to the ECU 150, information of the target route for HEV 100. In some embodiments, navigation system 205 may use information stored in a remote database, like map database 204, and/or some information processing center with which HEV 100 can communicate. A part of the processing executed by the navigation system 205 may be executed remotely as well.

Actuators 206 may be devices that execute running controls of HEV 100. The actuators 206 may include, for example, a throttle actuator, a brake actuator, and a steering actuator. For example, the throttle actuator controls, in accordance with a control signal output from the ECU 150, an amount by which to open the throttle of HEV 100 to control a driving force (the engine) of HEV 100. In another example, actuators 206 may include one or more of MGs 191 and 192, where a control signal is supplied from the ECU 150 to MGs 191 and/or 192 to output motive force/ energy. The brake actuator controls, in accordance with a control signal output from the ECU 150, the amount of braking force to be applied to each wheel of the vehicle, for example, by a hydraulic brake system. The steering actuator controls, in accordance with a control signal output from the ECU 150, driving an assist motor of an electric power steering system that controls steering torque.

HMI 207 may be an interface used for communicating information between a passenger(s) (including the operator) of HEV 100 and autonomous control system 200. For example, the HMI 207 may include a display panel for displaying image information for the passenger(s), a speaker for outputting audio information, and operation buttons or a touch panel used by the occupant for performing an input operation. HMI 207 may also or alternatively transmit the information to the passenger(s) through a mobile information terminal connected wirelessly and receive the input operation by the passenger(s) through the mobile information terminal.

Monitor device 208 monitors a status of the driver/ operator. The monitor device 208 can check a manual driving preparation state of the driver. More specifically, the monitor device 208 can check, for example, whether or not the driver is ready to start manual operation of HEV 100. Moreover, the monitor device 208 can check, for example, whether or not the driver has some intention of switching HEV 100 to a manual mode of operation.

For example, the monitor device 208 may be a camera that can take an image of the driver, where the image can be used for estimating the degree to which the driver's eyes are open, the direction of the driver's gaze, whether or not the driver is holding the steering wheel, etc. Monitor device 208 may also be a pressure sensor for detecting the amount of pressure the driver's hand(s) are applying to the steering wheel. As another example, the monitor device 208 can be a camera that takes an image of a hand of the driver.

A shift lever 209 can be positioned at a shift position, e.g., "A (AUTOMATIC)," "D (DRIVE)," etc. The shift position "A" indicates, for example, an automatic engage mode where autonomous control is engaged automatically. The shift position "D" indicates a triggered engage mode where autonomous control is engaged in response to a driver-initiated request to operate HEV 100 in an autonomous driving mode.

Auxiliary devices 210 may include devices that can be operated by the driver of the vehicle, but are not necessarily drive-related, such as actuators 206. For example, auxiliary devices 210 may include a direction indicator, a headlight, a windshield wiper and the like.

ECU 150 may execute autonomous control of the vehicle, and may include an acquisition unit 211, a recognition unit 212, a navigation plan generation unit 213, a calculation unit 214, a presentation unit 215, and a control unit 216.

Acquisition unit 211 may obtain the following operation amounts or levels of actuation based on the information obtained by the internal sensor 203: steering operation, acceleration operation, and brake operation by the driver during an autonomous control mode; and the level of steering operation, acceleration operation, and brake operation by the driver of the vehicle during a manual control mode.

Recognition unit 212 may recognize or assess the environment surrounding or neighboring HEV 100 based on the information obtained by the external sensor 201, the GPS reception unit 202, and/or the map database 204. For example, the recognition unit 212 includes an obstacle recognition unit (not shown), a road width recognition unit (not shown), and a facility recognition unit (not shown). The obstacle recognition unit recognizes, based on the information obtained by the external sensor 201, obstacles surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle can refer to a property of the obstacle such as hardness and a shape of the obstacle.

The road width recognition unit recognizes, based on the information obtained by the external sensor 201, the GPS reception unit 202, and/or the map database 204, a road width of a road in which the vehicle is running.

The facility recognition unit recognizes, based on the map information obtained from the map database 204 and/or the vehicle position information obtained by the GPS reception unit 202, whether or not HEV 100 is operating/being driven through an intersection, in a parking structure, etc. The facility recognition unit may recognize, based on the map information and the vehicle position information, whether or not the vehicle is running in a school zone, near a childcare facility, near a school, or near a park, etc.

Navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The navigation plan may be reflect one or more operating conditions/controls to effectuate the target route. For example, the navigation plan can include a target speed, a target acceleration, a target deceleration, a target direction, and/or a target steering angle with which HEV 100 should be operated at any point(s) along the target route so that the target route can be achieved to reach a desired destination. It should be understood that navigation plan generation unit 213 generates the navigation plan such that HEV 100 operates along the target route while satisfying one or more criteria and/or constraints, including, for example, safety constraints, legal compliance rules, operating (fuel/ energy) efficiency, and the like. Moreover, based on the existence of obstacles surrounding HEV 100, the navigation plan generation unit 213 generates the navigation plan for the vehicle so as to avoid contact with such obstacles.

Calculation unit 214 may calculate a threshold used for determining whether or not to switch from autonomous control to manual driving or vice versa. The determination can be performed based on the operating levels associated with the manner in which the driver is operating HEV 100 during autonomous control which is obtained by the acquisition unit 211. For example, the driver of HEV 100 may suddenly grasp the steering wheel (which can be sensed by internal sensor 203) and stomp on the brake pedal (which can be sensed by monitor device 208). The pressure on the steering wheel and the level of actuation of the brake pedal may be excessive enough (exceed a threshold) suggesting that the driver intends to override the autonomous control system 200.

Presentation unit 215 displays, on a display of the HMI 207, a threshold which is calculated by the calculation unit 214 and used for determining whether or not to execute the switching from autonomous control to the manual driving or vice versa.

Control unit 216 can autonomously control HEV 100 based on the navigation plan generated by navigation plan generation unit 213. The control unit 216 outputs, to the actuators 206, control signals according to the navigation plan. That is, the control unit 216 controls actuators 206 based on the navigation plan, and thereby autonomous control of HEV 100 is executed/achieved. Moreover, certain levels of operation, e.g., steering wheel actuation, by the driver can be detected by the acquisition unit 211. When such level(s) equal or exceed the threshold calculated by the calculation unit 214 in a period during which autonomous control is being used to operate HEV 100, control unit 216 executes a switching from autonomous control to manual control.

Figure 2B:
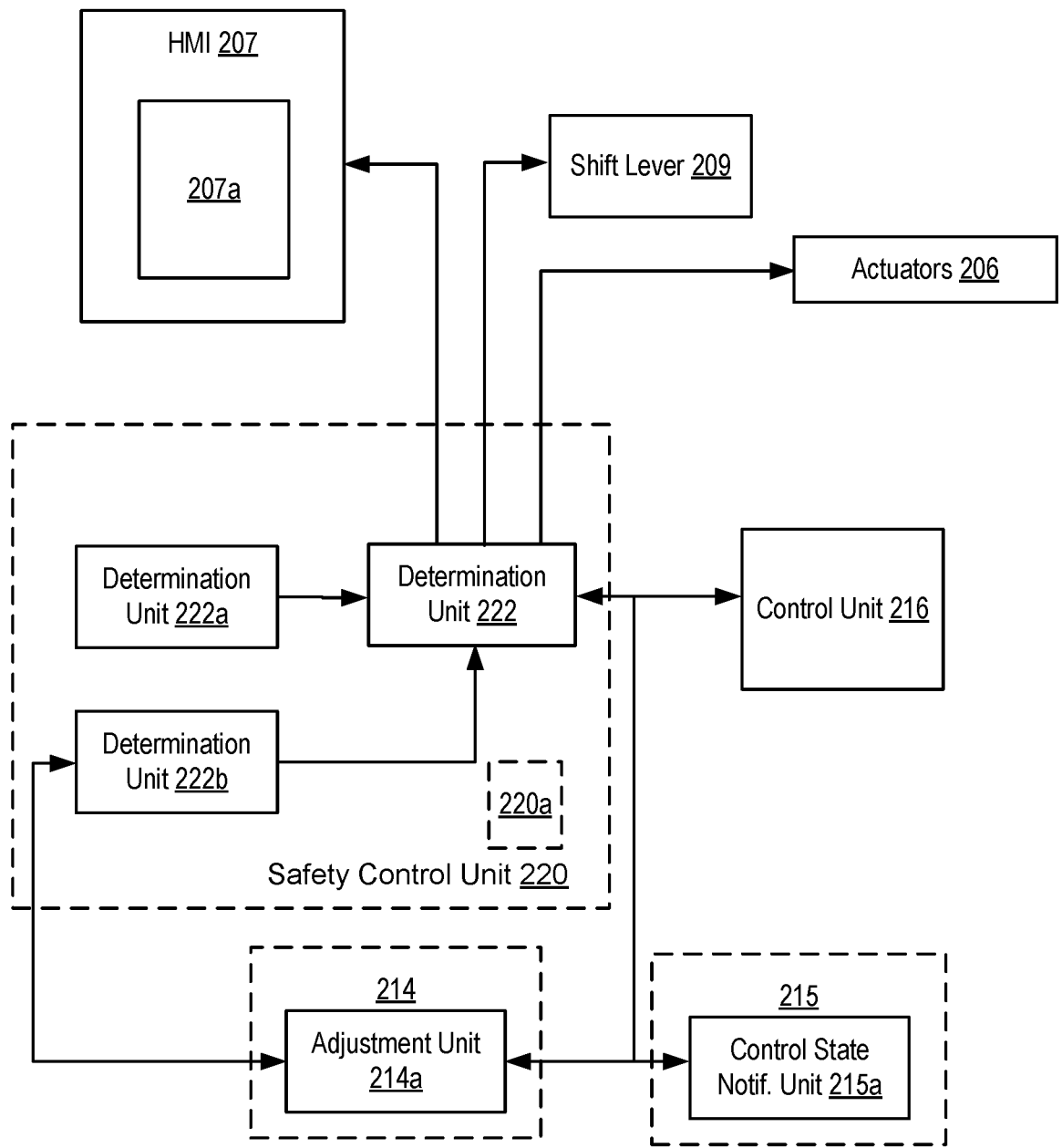
FIG. 2B illustrates an example safety control unit aspect of the autonomous control system of FIG. 2A.

Referring to FIG. 2B, control unit 216 operatively interacts with safety control unit 220 that determines whether or not autonomous control system 200 (in particular, control unit 216) can engage (activate, start) in autonomous control of HEV 100. For example, safety control unit 220 may include one or more determination units, e.g., determination unit 222a determines whether or not autonomous control can be engaged, based on a difference between a vehicle position calculated from signals received by the GPS reception unit 202 and an actual vehicle position calculated based on an output signal from the external sensor 201, the map information of the map database 204 and so forth. For example, a threshold condition associated with engagement of autonomous control in HEV 100 may be predicated on travel along a certain type of roadway, e.g., known segment(s) of road within map database 204, such as a freeway (versus) country lane. Road curvature may be another condition/characteristic on which autonomous control of HEV 100 may be based. Determination unit 222a may make its determination based on one or more determinative factors.

Control unit 216 may further interact with a determination unit 222b of safety control unit 220 that determines whether or not a trigger to deactivate (stop) an autonomous control mode exists. For example, determination unit 222b can determine whether or not to execute the switch from the autonomous control to manual control based on the level of steering wheel actuation, brake pedal actuation, etc. effectuated by the driver while HEV 100 is being operated in an autonomous control mode, which is obtained by the acquisition unit 211. Other determinative factors or considerations may be the amount of acceleration or deceleration experienced by HEV 100, also determined by acquisition unit 211. When determination unit 222 determines that the autonomous control can be engaged, based on the determinations performed by determination units 222a and/or 222b, control unit 216 engages autonomous control of HEV 100. That is, determination unit 222 may act as a determination aggregator that aggregates determinations rendered by other determination units. Determination unit 222 may be a circuit, e.g., application-specific integrated circuit, logic, software, or some combination thereof that processes the individual determinations rendered by the other determination units (e.g., determination units 222a and 222b) to render an overall determination. That overall determination may control operation of control unit 216, e.g., to disengage autonomous control and switch to manual control or engage in autonomous control.

On the other hand, when determination units 222a and/or 222b determine that a switch from autonomous control to the manual control should be executed, autonomous control is deactivated/disengaged by control unit 216 or control unit 216 is itself deactivated/disengaged, and the driver proceeds to manually control HEV 100. It should be understood that other determination units may be used (or only a single determination unit may be used). In the case of multiple determination units being used, in some embodiments, any single determination that manual control should be executed can serve as a trigger to deactivate autonomous control. In some embodiments, presentation unit 215 is provided with a control state notification unit 215a that notifies the driver of a fact that HEV 100 is operating under autonomous control is in execution, and so forth. Such a notification may be displayed on a display of HMI 207, for example. Likewise, If a switch from autonomous control to the manual control is executed, the control state notification unit 215a displays, on the display of HMI 207 a corresponding notification.

HMI 207, in some embodiments, may include an autonomous control engagement trigger input unit 207a that can be actuated by the driver of HEV 100 to engage in an autonomous control mode (after safety control unit 220 determines that autonomous control can be effectuated).

In some embodiments, the driver of HEV 100 may be able to select an automatic autonomous control engage mode, where autonomous control unit 216 can be automatically engaged when safety control unit 220 determines that the autonomous control can be engaged. In some embodiments, shift lever 209 may be used to set a triggered autonomous control mode and an automatic engage mode (as alluded to above by actuating shift lever 209 to an "A" (AUTOMATIC) position or to a "D" (DRIVE) position.

Figure 3:
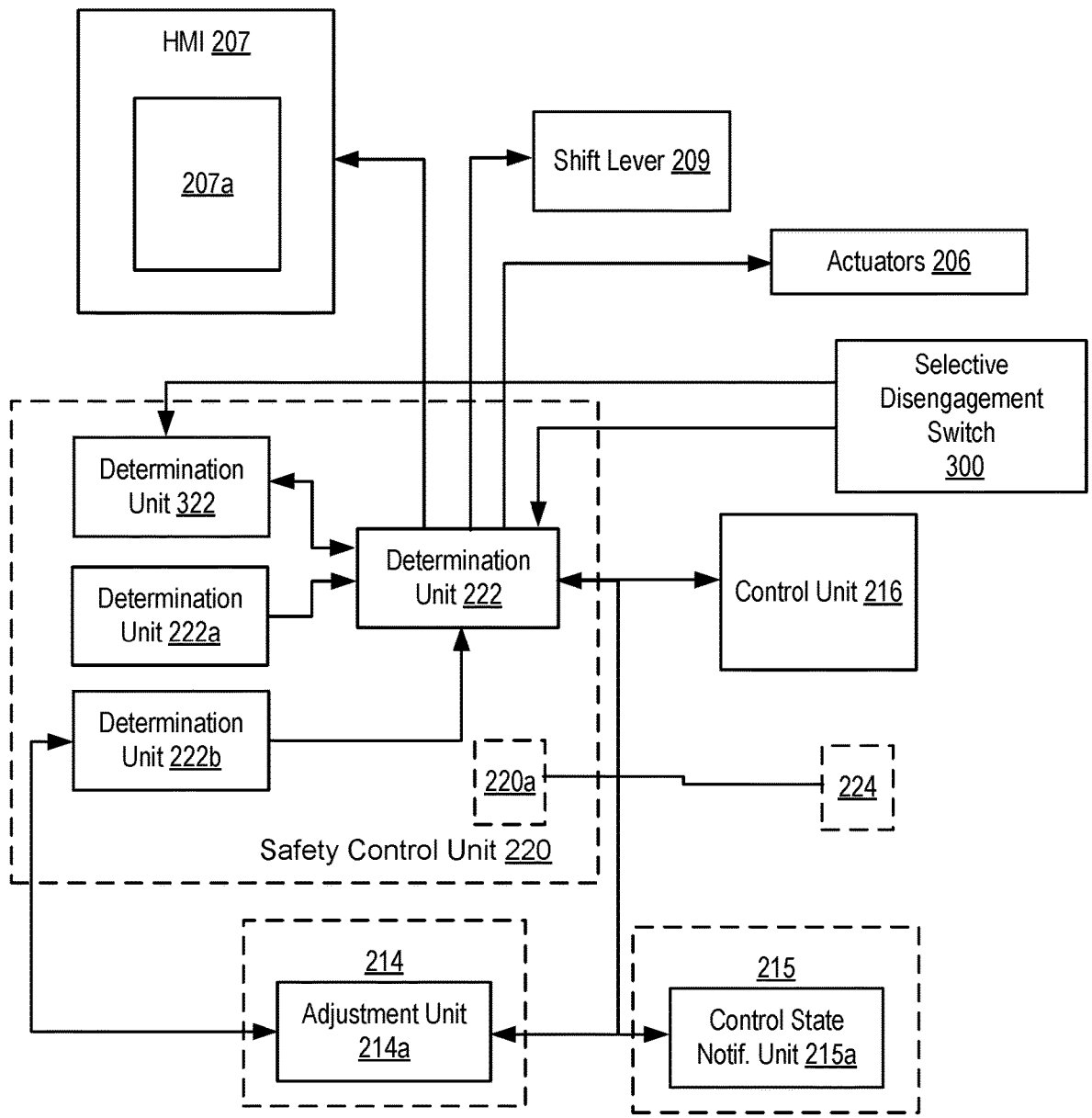
FIG. 3 illustrates an example driver-initiated selective disengagement mechanism in accordance with various embodiments.

As alluded to above, a selective disengagement mechanism may be used to selectively override operation of autonomous control system 200. FIG. 3 illustrates an example implementation of such a selective disengagement mechanism. That is, in addition the above-described components and functionality of autonomous control system 200, FIG. 3 illustrates a selective disengagement switch 300 that is operatively connected to determination unit 222, which in turn is operatively connected to determining unit 322.

Figure 4:
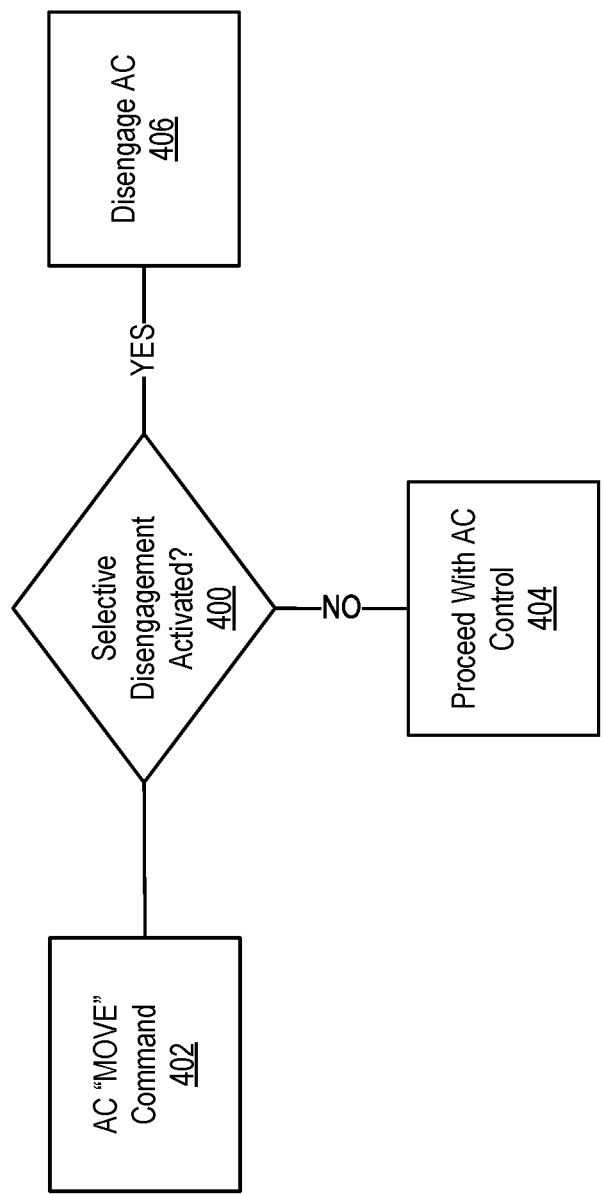
FIG. 4 is a flow chart illustrating the operation of the driver-initiated selective disengagement mechanism in accordance with one embodiment.

Determination unit 322, like the other determination units 222, 222a, and/or 222b, may comprise logic, circuitry, software, or some combination thereof effectuating processing and determining capabilities described in conjunction with FIG. 4. Information regarding the actuation of selective disengagement switch (or other invocation mechanism) 300 can be transmitted to determination unit 322. That is, determination unit 322 can perform a check 400 to determine of selective disengagement is activated.

However, determination unit 322 will do nothing unless it becomes aware of control unit 216 commanding movement of HEV 100. For example, determination unit 322 may comprise logic that upon receiving a signal or notification that selective disengagement switch 300 is switched on or otherwise actuated, will go into an active wait state until another signal or notification is received indicating that selective disengagement switch 300 is switched off or that determination unit 222 is going to allow control unit 216 to initiate movement of HEV 100. Upon receipt of a signal or notification that selective disengagement switch 300 is switched off, determination unit 322 will go into an inactive wait state and wait until receipt of another signal or notification that selective disengagement switch 300 is turned on.

In the event HEV 100 is being operated in autonomous control mode, determination unit 322 will again perform a check at operation 400 to determine if selective disengagement switch 300 is turned on or otherwise activated, and determination unit 322 will enter an active wait state. If and when determination unit 222 is to send/does send a command to control unit 216 to allow movement of HEV 100 to commence, determination unit 322 will transmit a determination to determination unit 222 to override control unit 216's control of actuators 206. Determination unit 222 will prohibit control unit 216 from, e.g., sending control or command signals to actuators 206. Thus, as shown in FIG. 4, at operation 406, autonomous control is disengaged. If at operation 400, determination unit 322 determines that selective disengagement switch 300 is not activated, it remains in an inactive wait state and does nothing. Determination unit 222 can simply proceed with a determination that control unit 216 can control actuators 206 to initiate movement of HEV 100. This is reflected at operation 404 by allowing autonomous control to proceed with the command from control unit 216 to "move" HEV 100.

In accordance with another embodiment, when selective disengagement switch 300 has not been actuated, any commands from control unit 216 may be passed through as previously described, and allowed to effectuate autonomous control of HEV 100 (operation 404). If, however, HEV 100 is operating in an autonomous control mode, and selective disengagement switch 300 has been actuated, a determination can be made that selective disengagement switch 300 is active (operation 400 of FIG. 4), and determination unit 322 can actively monitor command signals from control unit 216. Upon sensing/receipt of a move command from control unit 216 (operation 402), determination unit 322 can intercept/filter such a command signal and the command signal is prevented from reaching actuators 206, disengaging autonomous control (operation 406).

As alluded to above, autonomous control system 200, or more particularly, control unit 216 is unaware/ignorant of the operation of selective disengagement switch 300. However, it should be noted that although autonomous control system 200 (generally) and control unit 216 do not use the state of selective disengagement switch 300 as an input/factor for their decision-making, the status of selective disengagement switch 300 (its actuation and/or non-actuation) may be logged with other signals of/from autonomous control system 200. In this way, and as alluded to above, its use may be annotated/identified along a timeline (or in time-series data) to make data regarding an event(s) easier to find and/or analyze, e.g., after a collection cycle, after a drive event, after a trip, etc. Again, control unit 216 operates based on determinations made by determination unit 222 of safety control unit 220. Thus, when it is overridden, e.g., prevented from command actuators 206 to actuate and effectuate movement of HEV 100, control unit 216 still sends commands to actuators 206 through determination unit 222, but determination unit 222 can block those signals from reaching actuators 206. For example, determination unit 222 may be configured to ignore any signals from control unit 216 upon a determination from determination unit 322 that autonomous control is to be overridden. In this way, control unit 216 is kept unaware that its commands are being overridden.

Therefore, as also noted above, data collection at a memory unit 222a of safety control unit 220, e.g., a cache, a data repository, log, etc. may continue to receive and store/log information regarding the commands that control unit 216 is sending regardless of whether selective disengagement switch 300 is turned on. Memory unit 222a may also store/log information regarding activation of selective disengagement switch 300. In some embodiments, memory unit 222a may offload stored information to a remote data store, e.g., data store 224. Thus, any processing of autonomous control data can include both command information from control unit 216 regarding autonomous control operations, e.g., commands to move HEV 100, along with information regarding when selective disengagement switch 300 was activated. Such information can be useful in determining, e.g., erroneous or potentially erroneous operation of autonomous control system 200 that would otherwise be lost in conventional systems where simple disengagement of autonomous control actually prevents autonomous control systems from operating at all, including sending autonomous control commands In some embodiments, data collection can comprise monitoring the operation of autonomous control system or aspects thereof, e.g., control unit 216 over time. Thus, the aforementioned data/information that is stored/logged can include time-series data involving some subset of or all aspects of autonomous control system 200. For example, commands from control unit 216 to actuators 206 may be monitored, and time-series data representative of the operating states/conditions of control unit 216 may be captured. For example, time-series data may be collected which includes not only the commands/operating conditions or characteristics of control unit 216, but also determination units 222, 222a, 222b, 322, external sensor 201, GPS reception unit 202, and so on.

Figure 5:
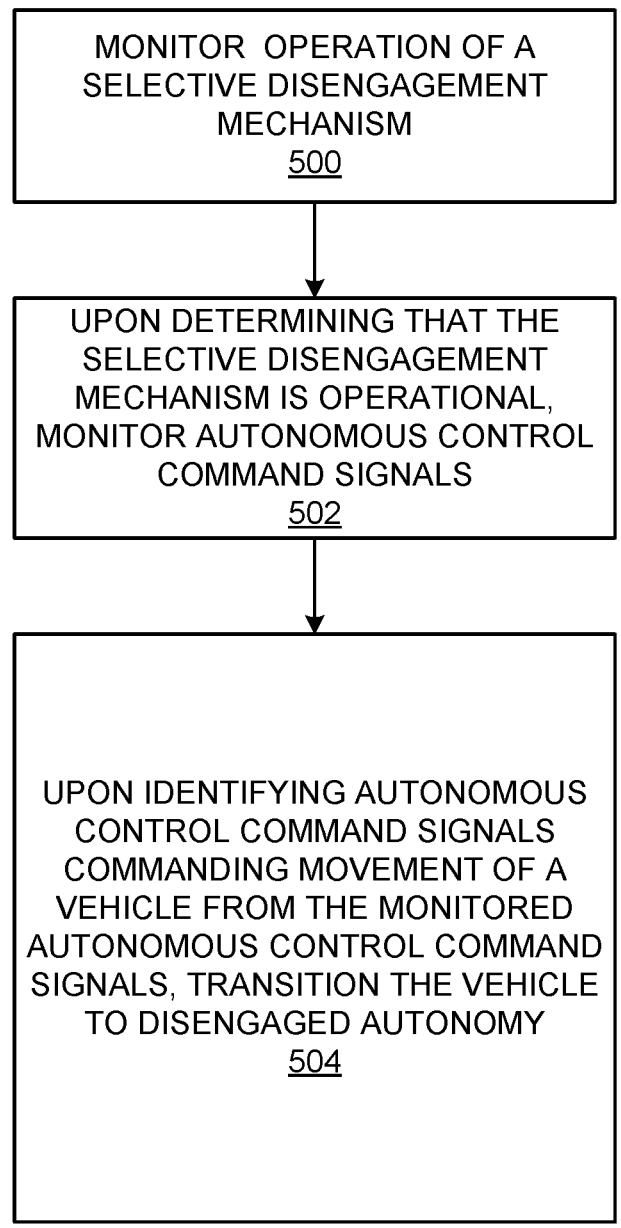
FIG. 5 is a flow chart illustrating operations that may be performed to effectuate driver-initiated selective disengagement in accordance with one embodiment.

FIG. 5 is a flow chart illustrating example operations that may be performed to selectively disengage autonomous control in a vehicle in accordance with one embodiment. As noted above, in some embodiments, operation of a selective disengagement mechanism may be monitored (operation 500). In some embodiments, the monitoring of the selective disengagement mechanism, e.g., selective disengagement switch 300, may be a safety control unit, such as safety control unit 220 of FIG. 3 (and in some embodiments, a determination unit, e.g., determination unit 322 or determination unit 222). The autonomous control system, and in particular, a control unit thereof, e.g., control unit 216, intentionally left unaware of the actuation of enablement of selective disengagement mechanism—hence monitoring by safety control unit 220 (or some element(s) thereof).

Upon determining that the selective disengagement mechanism is operational, autonomous control signals are monitored (operation 502). For example, upon arriving at or recognizing a safety-critical event/area, a vehicle operator may actuate or otherwise enable that selective disengagement mechanism. In some embodiments, the vehicle operator holds down a button, presses and releases a button, states an actuation command, etc. Because the vehicle operator activates the selective disengagement mechanism pro-actively, any "false" or erroneous autonomous control command signal to move the vehicle can be immediately or (more quickly than the vehicle operator could react) override autonomous control. That is, upon identifying autonomous control command signals commanding movement of a vehicle from the monitored autonomous control command signals, a transition to disengaged autonomy is effectuated (operation 504). That is, the autonomous control command signal commanding the movement of the vehicle from effectuating movement of the vehicle is prevented. In some embodiments preventing movement of the vehicle can be accomplished by blocking the command signal from reaching one or more actuators, the enablement of which would result in the commanded movement. Referring back to FIG. 3, for example, determination unit can prevent any signals from control unit 216 from reaching actuators 206. In other embodiments, the command signals may be modified or transformed into another signal, e.g., .dummy or null signal, or a command signal to not move.

If the vehicle operator no longer deems the safety-critical event/scenario to have passed, he/she can simply deactivate the selective disengagement mechanism, and autonomous control of the vehicle continues as normal. To de-actuate/deactivate the selective disengagement mechanism the vehicle operator may release the selective disengagement mechanism (after holding down), press the selective disengagement mechanism again, states a deactivation command, etc.

Figure 6:
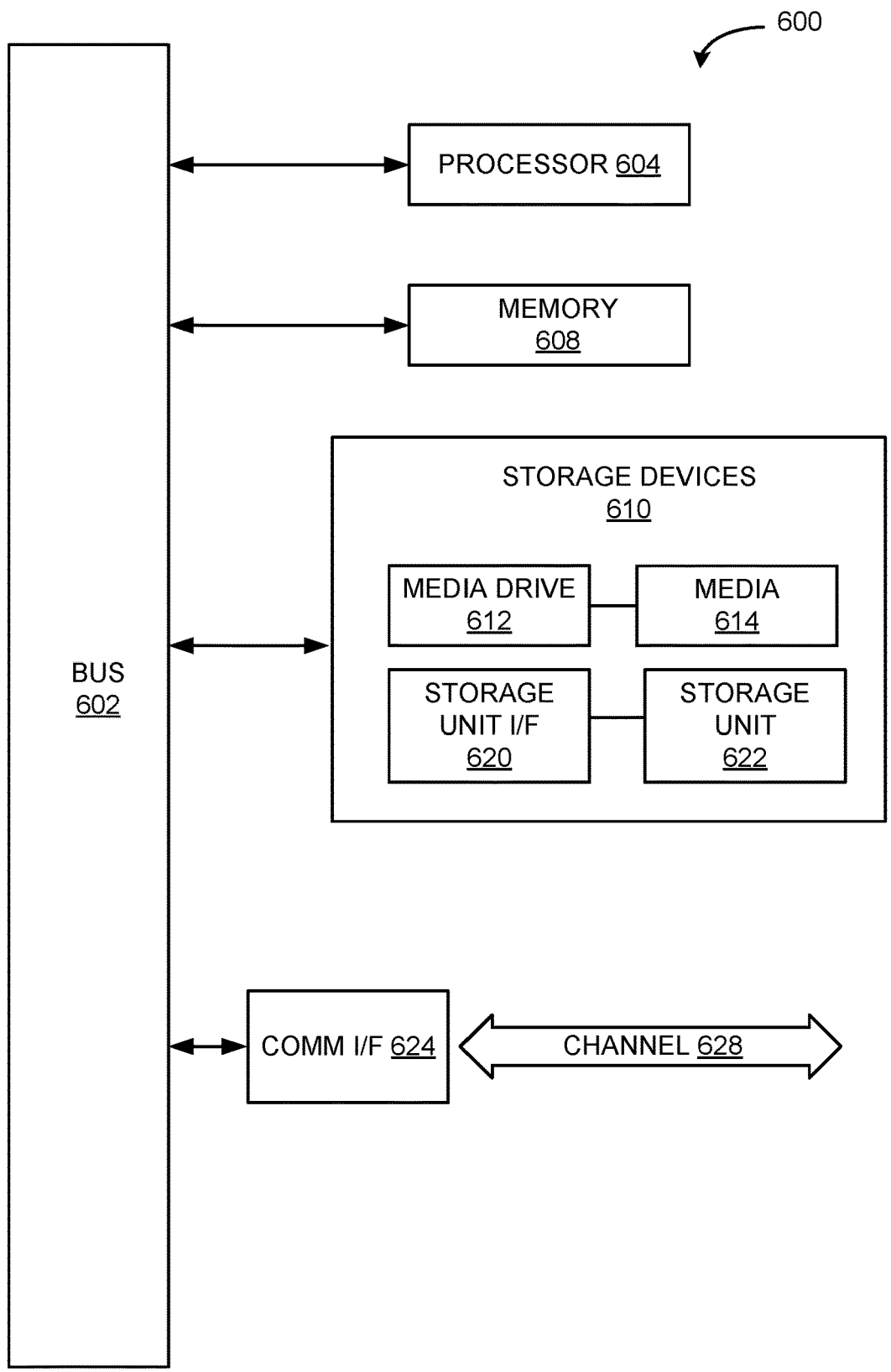
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
    an autonomous control system configured to autonomously control one or more systems of the vehicle, wherein the autonomous control system includes a recognition unit configured to recognize one or more obstacles surrounding the vehicle;
    a selective disengagement mechanism adapted to be activated by a driver of the vehicle, wherein the selective disengagement mechanism is configured to allow the autonomous control system to be overridden only when the selective disengagement mechanism is operational; and
    a safety control unit configured to disengage autonomous control of one or more systems of the vehicle when the selective disengagement mechanism is activated, and when the autonomous control system attempts to initiate movement of the vehicle with the one or more obstacles surrounding the vehicle.

2. The vehicle of claim 1, wherein the selective disengagement mechanism comprises an actuatable mechanism actuated by a passenger of the vehicle.

3. The vehicle of claim 1, wherein the safety control unit comprises one or more determination units making determinations regarding whether or not to allow the autonomous control of the vehicle to be executed based on one or more factors.

4. The vehicle of claim 3, wherein at least two of the one or more factors comprises whether the selective disengagement mechanism is operational and whether the autonomous control system attempts to initiate movement of the vehicle.

5. The vehicle of claim 1, wherein the safety control unit effectuates overriding of the autonomous control system by preventing one or more command actuators from effectuating movement of the vehicle.

6. The vehicle of claim 5, wherein despite the overriding of the autonomous control system, the autonomous control system continues to send commands to one or more actuators, and wherein the autonomous control system is ignorant of preventing commands from reaching one or more actuators.

7. The vehicle of claim 5, further comprising a memory unit configured to: monitor transmission of commands from the autonomous control system, and record information regarding the commands even when the commands are being blocked.

8. The vehicle of claim 7, wherein the memory unit is configured to further record time-series data regarding operating conditions and characteristics of one or more vehicle systems under control of or providing guidance to the autonomous control system.

9. The vehicle of claim 7, wherein the memory unit is further configure to record time-series data representative of activation and deactivation of the selective disengagement mechanism.

10. A vehicle, comprising an autonomous control system configured to autonomously control one or more systems of the vehicle comprising:
    a processor; and
    a memory unit operatively connected to the processor and including computer code, that when executed, causes the processor to:
        monitor operation of a selective disengagement mechanism;
        monitor autonomous control command signals from the autonomous control system of the vehicle, when the selective disengagement mechanism is activated;
        monitor one or more obstacles surrounding the vehicle; and
        disengage autonomous control of one or more systems of the vehicle when the selective disengagement mechanism is activated, and the autonomous control system attempts to initiate movement of the vehicle with one or more obstacles surrounding the vehicle.

11. The vehicle of claim 10, wherein the operation of the selective disengagement mechanism comprises actuation of the selective disengagement mechanism by a vehicle passenger in response to a passenger-recognized safety-critical scenario.

12. The vehicle of claim 10, wherein the memory unit includes computer code, that when executed, further causes the processor to allow autonomous control command signals to pass to one or more vehicle actuators enabling movement of the vehicle upon determining that the selective disengagement mechanism is not operational.

13. The vehicle of claim 10, wherein the memory unit includes computer code, that when executed, further causes the processor to log the autonomous control command signals and operation of a selective disengagement mechanism.

14. The vehicle of claim 10, wherein the computer code, that when executed causes the processor to transition the vehicle to disengaged autonomy.

15. A vehicle, comprising:
    an autonomous control system configured to autonomously control one or more systems of the vehicle comprising:
    a processor; and
    a memory unit operatively connected to the processor and including computer code, that when executed, causes the processor to:
        monitor one or more obstacles surrounding the vehicle;
        monitor autonomous control command signals from the autonomous control system of the vehicle when a selective disengagement mechanism is activated; and
        disengage the autonomous control command signals from the autonomous control system when the selective disengagement mechanism is activated, and the autonomous control system attempts to initiate movement of the vehicle with the one or more obstacles surrounding the vehicle.

16. The vehicle of claim 15, wherein operation of the selective disengagement mechanism comprises actuation of the selective disengagement mechanism by a vehicle passenger in response to a passenger-recognized safety-critical scenario.

17. The vehicle of claim 15, wherein the memory unit includes computer code, that when executed, further causes the processor to allow autonomous control command signals to pass to one or more vehicle actuators enabling movement of the vehicle upon determining that the selective disengagement mechanism is not operational.

18. The vehicle of claim 15, wherein the memory unit includes computer code, that when executed, further causes the processor to log the autonomous control command signals and operation of a selective disengagement mechanism.

19. The vehicle of claim 15, wherein the computer code, that when executed causes the processor to transition the vehicle to disengaged autonomy.

* * * * *